United States Patent [19]

Wingrave et al.

[11] Patent Number: 4,988,450
[45] Date of Patent: Jan. 29, 1991

[54] SHALE-STABILIZING DRILLING FLUID ADDITIVES

[75] Inventors: James A. Wingrave, Chadds Ford, Pa.; Thomas S. Carter, Spring, Tex.; Charles F. Palmer, Jr., Christiana, Del.

[73] Assignee: E. I. du Pont de Nemours and Company, Wilmington, Del.

[21] Appl. No.: 316,731

[22] Filed: Mar. 3, 1989

Related U.S. Application Data

[63] Continuation-in-part of Ser. No. 168,306, Mar. 15, 1988, abandoned.

[51] Int. Cl.$^5$ .......................... C09K 7/02; E21B 21/00
[52] U.S. Cl. .................................... 252/8.514; 175/65
[58] Field of Search ............. 175/65; 252/8.51, 8.514, 252/8.513

[56] References Cited

U.S. PATENT DOCUMENTS

| | | | |
|---|---|---|---|
| 2,133,759 | 10/1938 | Vail et al. | 252/8.51 X |
| 2,146,693 | 2/1939 | Vietti et al. | 252/8.51 X |
| 2,552,775 | 5/1951 | Fischer et al. | 252/8.51 X |
| 3,017,351 | 1/1962 | Scott et al. | 252/8.514 |
| 3,318,396 | 5/1967 | Tailleur | 252/8.51 X |
| 3,738,437 | 6/1973 | Scheuerman | 175/70 |
| 4,045,357 | 8/1977 | Reed | 175/72 X |
| 4,447,341 | 5/1984 | Block | 252/8.551 X |
| 4,473,480 | 9/1984 | Green et al. | 252/8.514 X |
| 4,536,297 | 8/1985 | Loftin et al. | 252/8.51 X |
| 4,743,384 | 5/1988 | Lu et al. | 252/8.514 |

FOREIGN PATENT DOCUMENTS 2089397 6/1982 United Kingdom ............. 252/8.514

Primary Examiner—George A. Suchfield

[57] ABSTRACT

Additive compositions and aqueous drilling fluids which impart improved wellbore stability in drilling shale formations consisting essentially of one or more water-soluble high molecular weight polymers capable of forming relatively strong nucleophilic sites when treated with base and one or more potassium salts which have sufficient alkalinity to raise the pH of the resultant drilling fluid to above 9.0, but whose anions are relatively weak nucleophiles compared to the polymeric nucleophilic sites.

25 Claims, No Drawings

SHALE-STABILIZING DRILLING FLUID ADDITIVES

CROSS-REFERENCE TO RELATED APPLICATION

This is a continuation-in-part of application Ser. No. 168,306 filed Mar. 15, 1988, now abandoned.

FIELD OF INVENTION

This invention relates to environmentally safe shale-stabilization additives and to aqueous drilling muds containing environmentally safe shale-stabilization additives.

BACKGROUND OF INVENTION

During well-drilling operations, formations are often encountered which lose physical and dimensional integrity when exposed to aqueous drilling fluids (muds). In most cases, such formations comprise reactive shales. Prior to the advent of oil-based, emulsion and invert emulsion muds, great difficulty was encountered in drilling these types of shales. On the other hand, while hydrocarbon-containing muds make drilling through reactive shales possible, they pose safety and environmental hazards and can interfere with well-logging operations.

A variety of water-based drilling additives has been developed over the years in an attempt to deal with shale drilling problems effectively while avoiding the problems encountered when oil-based muds were used. Vail et al., in U.S. Pat. No. 2,133,759, disclose muds containing alkali metal silicates, but sodium is the sole silicate that they disclose using, and they state that not all sodium silicates are suitable. In U.S. Pat. No. 2,146,693, Vietti et al. disclosed a drilling fluid containing one of several sodium salts, including sodium silicate, the sodium salt content of the mud being in excess of 20% by weight. Sawdon, in U.K. Patent Application 2 089 397 A, disclosed an aqueous wellbore fluid for use as a drilling, well completion, packing, perforating or workover fluid containing at least 20% by weight of potassium carbonate; optionally a water-soluble polymeric viscosifier, such as carboxymethylcellulose, was added to the wellbore fluid. Gray et al., in "Composition and Properties of Oil Well Drilling Fluids", 4th Edition (Gulf Publishing Company 1980), reported the use of potassium salts in drilling fluids to suppress the swelling of bentonite, potassium chloride being preferred. Another standard industry reference that describes the shale stabilizing effect of the potassium ion in polymer muds may be found in SPE 10100 "Fundamentals and Use of Potassium/Polymer Drilling Fluids to Minimize Drilling and Completion Problems Associated with Hydratable Clays," by R. P. Steiger, presented at the 56th Annual Fall Technical Conference, Dallas, Tex., Oct. 5-7, 1981. Anderson et al., in U.S. Pat. No. 4,142,595, disclosed shale-stabilizing drilling fluids containing flaxseed gum together with potassium and/or ammonium salts. U.S. Pat. No. 4,447,341, to Block, relates to a drilling fluid containing AlO(OH) and a crosslinked polyvinyl alcohol together with a potassium salt, such as potassium chloride, as a clay-stabilizing composition. Corley et al., in the Oil & Gas Journal, Jan. 27, 1987, described shale inhibition using an aqueous system, maintained at a pH of 9.0 or less, which contains an unidentified nonionic polymer combined with potassium phosphate complex of undefined composition. Lu et al., in U.S. Pat. No. 4,743,384, disclose an aqueous drilling mud consisting essentially of carboxymethyl guar. Lu et al. additionally stated that the thermal stability of their drilling muds can be enhanced up to at least 275° F. upon the addition of a water-soluble metal carbonate such as potassium or sodium carbonate or bicarbonate. However all examples of such compositions were limited to the use of sodium carbonate or bicarbonate.

The current technology of choice for aqueous-based shale-stabilizing muds involves the use of partially hydrolyzed polyacrylamide (PHPA) combined with potassium chloride. Scheuerman disclosed such a combination in U.S. Pat. No. 3,738,437 as part of a regimen for dealing with shale-drilling problems. Systems involving PHPA in combination with various electrolytes, including potassium chloride, at pHs of 8.5 to 10.0, were also reviewed by Clark et al. in SPE/IADC 16081, presented at the Mar. 15-18, 1987 SPE/IADC Drilling Conference in New Orleans, La.

While the systems developed thus far show improvement over the older water-based mud technology, they are sometimes inadequate when difficult shale formations are encountered. Operators are, therefore, forced to revert to hydrocarbon-containing fluids. It is desirable to provide improved additives for water-based muds that would minimize or completely avoid the need for oil-based systems when drilling problem shale formations.

BRIEF SUMMARY OF INVENTION

The present invention relates to additive compositions for aqueous muds which impart improved wellbore stability when used in drilling shale formations. The present invention relates also to a method for drilling effectively through unconsolidated shales (e.g. reactive shales) using such compositions.

DETAILED DESCRIPTION OF INVENTION

The compositions of the present invention consist essentially of one or more water-soluble polymers combined with one or more alkaline potassium salts in wide-ranging ratios effective to give a composition having a pH of at least 9. The water-soluble polymer, or polymers, of this invention are of relatively high molecular weight and are capable of forming nucleophilic sites when treated with a base. The potassium salt or salts are those whose anions are relatively strong Bronsted-Lowry bases; i.e. give a pH of 9 or above in the presence of an aqueous solution of the polymer, but are relatively weak nucleophiles. compared to the polymeric nucleophilic sites. Finding that shale-stabilization takes place effectively at pH 9 and higher in accordance with this invention runs contrary to the conventional wisdom in the field. The literature abounds with references which disclose that drilling fluids with a high pH give poor shale-drilling stabilization; e.g., see the foregoing articles by Corley et al. and Clark et al.

The weight ratio of polymer:potassium salt should generally be in the range between about 1:20 and about 3:1. A generally preferred ratio is one in the range between about 1:2 and about 1.5:1 When added to a drilling mud, the polymer/potassium salt composition should be used in an amount sufficient to effect consolidation of the shale, an effect which can be determined by observation of the condition of the cuttings being produced in the well-drilling operation. If the cuttings in the mud circulating over the screen in the well-drilling operation stick together, more of the polymer/salt composition is needed in the mud. The upper limit on the polymer content of the mud is one of practicality. If too much polymer is used, the cost of the mud will increase to an uneconomical level. Usually the polymer/salt composition is added to the mud at a level between about 0.01 weight percent and 10.0 weight percent (based on the weight of the aqueous phase), typically between about 0.1 and about 4.0 weight percent, preferably between about 0.3 and about 2.0 weight percent.

The polymers useful for the purposes of this invention must be
(a) water-soluble,
(b) capable of forming several nucleophilic sites within the same molecule when treated with bases, and
(c) of relatively high molecular weight.

Water-solubility of the polymers of this invention affords compatibility with aqueous muds and timely intimate contact with newly formed shale surfaces when in use. The polymers of this invention must not only be water-soluble but they should also have good wetting properties and a reasonable rate of dissolution in water for convenient use in the field. They should also afford aqueous solutions of low to moderate viscosities conventionally used in drilling wells, particularly oil and gas wells.

The polymers of this invention must be polyfunctional and be capable of forming relativity strong nucleophilic sites when treated with bases, particularly in comparison with the potassium salts of this invention. The concept of nucleophilicity in substitution reactions is described in detail in Chapter 10 of "Advanced Organic Chemistry: Reactions, Mechanisms, and Structure" by Jerry March, 3rd Edition, 1985, Wiley-Interscience, New York, N.Y. 10158.

The polymers of this invention must have a relatively high molecular weight. While the exact molecular weights will vary from polymer to polymer, it is a parameter that can be determined empirically. For example, tests using a variety of partially hydrolyzed vinyl acetate polymers (PHPVA - sometimes referred to as partially hydrolyzed polyvinylalcohols) have demonstrated a clear molecular weight dependency in effecting shale-stabilization in accordance with this invention. Hydrolyzed vinylacetate homopolymers having number average molecular weights ($M_n$) of about 46,000 or below, represented by ELVANOL® 90-50 and ELVANOL® 71-30, while giving some shale stabilizing effect, were substantially less effective than those of higher molecular weight. When ELVANOL® HV hydrolyzed vinyl acetate homopolymer, $M_n$ of about 75,000, was used as is, or crosslinked with glutaraldehyde to increase the $M_n$ to about 190,000, noticeable improvements in shale stabilization were observed.

The polymers of choice for purposes of the invention are vinyl acetate homo- and copolymers. In general, the homopolymers should be at least 75 mol percent hydrolyzed to the corresponding polyvinyl alcohols (PHPVA) and have an $M_n$ of 50,000 or more. PHPVA which is 88 mol percent hydrolyzed and having an $M_n$ of 85,000 is preferred. In practice, the vinyl acetate homopolymer can be hydrolyzed to about 98 to 99%. However, as that upper practical limit is approached, the polymer becomes more crystalline, and as a consequence, less soluble in water, requiring heat to dissolve it. PHPVA which are about 87 or higher mol percent hydrolyzed are the most soluble in water. The only constraint on molecular weight is water-solubility. In a preferred embodiment, one uses a vinyl acetate homopolymer which has been hydrolyzed about 87 percent.

In another preferred embodiment, one uses a vinyl acetate copolymer. In the latter embodiment, the vinyl acetate portion of the copolymer can be hydrolyzed as fully as possible (about 98 to 99%) without loss of water-solubility. The presence of copolymer units derived from monomers other than vinyl acetate inhibits crystallization and thereby promotes water-solubility. Representative comonomers include acrylic and methacrylic acid; amides such as acrylamide and methacrylamide; alkyl methacrylates and acrylates such as methyl methacrylate and methyl acrylate; and nitriles such as methacrylonitrile and acrylonitrile. The amount of the comonomer used with vinyl acetate will vary with the identity of the comonomer. However, that amount determined empirically by using that amount which provides the degree of water-solubility desired in the copolymer. For example, vinyl acetate copolymers have been prepared from the preferred comonomer, acrylic acid, using monomer mixtures containing 14 to 39 mol % (preferably 20 to 35 mol %) acrylic acid.

Other polymers suitable for the purposes of this invention include New-Drill HP partially (about 30 percent) hydrolyzed polyacrylamide which also contains potassium chloride, carboxymethyl hydroxyethyl celluloses with $M_n$ of between about 350,000 and 500,000, hydroxyethyl cellulose (e.g. HEC-10 with a $M_n$ of about 200,000), hydroxypropyl methyl celluloses having $M_n$ of about 300,000 and 1,000,000, and hydroxyhaving propyl guar (e.g. Jaguar HP-60 with a $M_n$ about 600,000.

One or more potassium salts may be used with the polymers of this invention. The anions of the potassium salts must be relatively strong Bronsted-Lowry bases, but they should be relatively weak nucleophiles in comparison with the polymeric nucleophilic sites. The potassium salts should be sufficiently alkaline so as to raise the pH to above 9.0 and to buffer it, at least temporarily, at a pH of at least 9.0; a pH range of 9.0 to 13.0 is suitable for this invention, with a pH range of 10.5 to 11.5 being preferred. It is technically feasible to operate at pH values between 11.5 and 13.0; however, they are somewhat less acceptable in respect of exposure of personnel in the field. A number of inorganic salts was evaluated in conjunction with the polymers of this invention. Potassium silicate, potassium carbonate and tribasic potassium phosphate proved to be quite effective at enhancing shale stabilization. The anions of these salts are all fairly strong Bronsted-Lowry bases and fairly weak nucleophiles. In all cases their alkalinity at the concentrations tested was sufficient to raise the pH of the test drilling fluids to above 9.0 and to maintain a pH of at least 9.0 during the testing period.

Potassium silicates can be obtained commercially in a variety of $SiO_2$ to $K_2O$ ratios. Those having a $SiO_2/K_2O$ ratio in the range of about 0.5 to 2.5 are suitable for use in the present invention, however, the range of 1.5 and 2.2 is preferred. When potassium silicates in the preferred range are included in the additive, the resultant fluids exhibit high levels of shale stabilization. Moreover, these types of potassium silicates are less expensive and less apt to absorb moisture during storage or handling.

Water-soluble, partially hydrolyzed polyvinyl acetate (PHPVA) combined with potassium silicate, with or without another alkaline potassium salt, are used in a preferred embodiment of the present invention. In general, a composition within that embodiment will contain by weight about 20 to 100 parts of PHPVA, about 25 to 90 parts of potassium silicate and 0 to about 90 parts of another alkaline potassium salt, such as potassium carbonate. A more preferred composition will contain about 40 to 70 parts of PHPVA, about 20 to 50 parts of potassium silicate and about 10 to 40 parts of potassium carbonate.

The ingredients that make up the compositions of this invention may be introduced into the drilling fluid in a variety of ways. For example, they may be combined by simple blending to form an additive mixture, commonly referred to as a pre-mix, for later incorporation into the drilling fluid, or each ingredient may be added separately as the drilling fluid is being prepared, with order of addition being discretionary. It has been found that the preferred PHPVA/potassium silicate/potassium carbonate composition should be present in the wellbore in a weight ratio of about 1 part of PHPVA to about 3 parts of potassium silicate and about 2 parts of potassium carbonate. Since the polymer exhausts more rapidly onto the shale surface than do the potassium salts, it has been found also that in order to maintain the preferred ratio, at timely intervals, one needs to charge to the mud a polymer/potassium salt composition rich in polymer. In a preferred embodiment, the polymer-rich composition consists of about 1 part of PHPVA, about 0.6 part of potassium silicate and about 0.4 part of potassium carbonate.

The present invention provides novel compositions for incorporation into aqueous drilling fluids. The resultant environmentally safe muds afford wellbore stabilization during drilling of troublesome unconsolidated shales. They give dimensional stability to newly formed wellbore surfaces, thereby minimizing cave-ins, sluffing, spalling, swelling and/or dispersion, each with its concomitant problems. Shale structure was described in detail by Wingrave et al. in SPE 16687 presented at the 62nd Annual Technical Conference and Exhibition of the Society of Petroleum Engineers in Dallas, Tex. in September 1987. Briefly, the integrity of unconsolidated shales depends on hydrogen bonding at the contact points of the shale particles. The intrusion of water often disrupts those forces resulting in the collapse of the shale structure.

The following is a presentation of a possible mechanism, not intended to be limiting, for the successful operation of the present invention whereby the shale formation is stabilized using a polymer with polyhydroxy functionality as the example:

(a) the anion of the potassium salt, a relatively strong Bronsted-Lowry base at a pH of 9.0 or higher, deprotonates the polymer to form a series of relatively strong nucleophilic sites (alkoxide ions in the case of a polyhydroxy polymer) along its chain, (b) the nucleophilic sites react with several of the silicon atoms on the surface of the shale so as to displace hydroxyl groups by nucleophilic substitution to form several carbon(polymeric)-oxygen-silicon covalent bonds between the polymer and the shale surface. When the same polymer molecule reacts in this way with silicon atoms on different shale particles, the polymer-shale bonds thus formed cement the shale particles together affording dimensional stabilization of the shale formation. The above-described mechanism is supported by infrared analyses which show the absence of carbon-oxygen-silicon covalent bonds on the surface of an untreated sample of shale but their presence in a sample which has been treated with potassium silicate and a polymer having polyhydroxy functionality and eluted with water, thus showing the permanent nature of the covalent chemical bonds formed by the treatment. The infrared work was similar to that described by R. G. Azrak and C. L. Angell in The Journal of Physical Chemistry, Vol. 77, No. 26, 1973, "Study of Alcohol-Silica Surface Reactions via Infrared Spectroscopy" which describes carbon-oxygen-silicon covalent bonds formed by the reaction of aliphatic monohydric alcohols with amorphous silica in the presence of Bronsted-Lowry bases.

In order for the above mechanism to be successful, there are additional prerequisites concerning the potassium salt and the polymer. First, while the anion of the potassium salt must be a strong Bronsted-Lowry base, i.e., give a pH above 9.0 in the polymer/salt solution so that it can deprotonate the polymer, it must also be a relatively weak nucleophile compared to the polymeric nucleophilic moieties produced by the deprotonation, so that it does not compete kinetically with them in the nucleophilic substitution reaction with the shale surface. For example, potassium silicate, potassium carbonate and potassium phosphate all have anions which are strong Bronsted-Lowry bases but relatively weak nucleophiles which cannot compete successsfully with the polymeric nucleophilic sites for reaction with the shale surfaces. They are therefore suitable for use in this invention. On the other hand, potassium hydroxide, a strong base, having the strongly nucleophilic hydroxide anion associated with it, would deprotonate the polymer but the large excess of hydroxide ions would compete too strongly with the polymeric nucleophilic moieties for reaction with the shale surface for effective stabilization. The anions of salts such as potassium chloride and potassium sulfate are not strong Bronsted-Lowry bases and therefore are less suitable for use in this invention.

The other prerequisites for the successful operation of the above mechanism are that the polymer must have a relatively high molecular weight and be polyfunctional. These qualities are required so that the polymer is long enough to react with the surface of more than one shale particle whereby the resultant covalent bonds cement the particles together so as to afford dimensional stability to the shale. There are other considerations in regard to polymer molecular weights. Each polymer family has its own unique spacial configuration in solution. Some coil in solution and, therefore, have a short effective length relative to their molecular weight while others are in an extended form in solution and have a longer effective length at a comparable molecular weight. Each polymer family, therefore, will have its own threshold value of molecular weight, unique to its own chemical structure, and its configuration in aqueous solution, at which it will become effective as a shale-stabilizer.

The additive compositions included in this invention were developed using the Dynamic Pellet Test (DPT) which measures the effect of a mud or test solution on a shale pellet under dynamic liquid shear conditions.

DYNAMIC PELLET TEST (DPT)

A DPT pellet is prepared by compressing $2.00 \pm 0.005$ on the dry basis, (Ms) of a powdered test shale containing about 15 percent moisture, into a cylinder which is axially mounted on the shank of a common 4d steel nail adjacent to the nail head. The steel die has a cross section of 0.2 square inches. A pressure of 5000 psig is applied for 2 minutes.

The nail is placed in the die first in a head-down, point-up vertical position. A common 1OL brass washer is then placed around the shank of the nail and allowed to drop so that it rests on the periphery of the inverted nail head. The powder is charged and the compression commenced. The punch, i.e., the smaller member that is pushed into the matrix of the die during compression, has an opening down its center to accommodate the nail shank during compression. When the compressed cylindrical pellet assembly is removed from the die, its bottom flat surface consists of the nail head and the outer periphery of the washer. A second identical washer is then fastened to the flat upper surface of the shale pellet using common epoxy resin or other suitable water-resistant glue.

The resultant cylindrical shale pellet supported on the nail shank adjacent to the head of the nail, and bounded on its flat upper and lower surfaces by washers, is then humidity-conditioned preferably at 84 percent relative humidity (RH) to constant weight (Mi) during the course of about 48 hours.

The DPT test begins by soaking the pellet assembly in the test mud or solution overnight (16–20 hours). The pointed end of the nail is then secured in a chuck mounted on a motor whose rotational speed can be controlled at 1500 rpm and the pellet is spun in the test liquid for one hour according to the following cycle:

(1) 15 minutes at room temperature,
(2) 30 minutes at 80° C., and
(3) 15 minutes at room temperature.

Immediately after the spinning cycle has been completed the shale pellet with its assembly is wiped with an absorbent paper tissue and weighed (Mw). The pellet with its assembly is then humidity-conditioned at constant RH, preferably 84 percent, to constant weight (Mf). The Mi, Mw and Mf weighings are done to the nearest milligram.

Test results are derived as follows:

Disintegration Index (DI)—The fraction of shale lost from the pellet during testing; 0=no loss and 100=complete loss of the shale from the assembly:

$$DI = \frac{\text{Shale Lost} \times 100}{\text{Initial Shale Weight}} = \frac{(Mi - Mf) \times 100}{Ms}$$

Swelling Index (SI) - The fractional weight gain by the pellet during testing with concomitant swelling: 0=no swelling or absorption and 100=absorption of 2 g of fluid:

$$SI = \frac{\text{Fluid Absorbed} \times 100}{\text{Final Shale Weight}} = \frac{(Mw - Mf) \times 100}{Ms - (Mi - Mf)}$$

Durometer A Hardness Index (HI)—The hardness of the shale pellet after testing as measured by the Durometer A penetrometer (Model No. 306L, PTC Instruments, Pacific Transducer Corporation); 0=totally soft pellet and 100=totally hard pellet. The value is simply determined by rotating the cylindrical shale surface against the probe pin of the penetrometer.

The ideal test mud or solution would yield test results of DI=0, SI=0 and HI=100.

Test pellet assemblies are conveniently prepared in the laboratory in batches of 40 to 60. It is expedient to run 4 spinning cycles side by side using a single temperature control bath.

EXAMPLES 1–3

The experiments set forth below were run using Pierre shale (from a natural outcropping in the Denver, Colo. area—13% albite, 42% quartz, 11% calcite, and 32% clay—major component: illite/smectite, minor components: illite and kaolinite with chlorite as a trace component).

Neither water-soluble polymers alone nor alkaline potassium salts alone are optimum shalestabilizers. However, as shown in Table 1, when they are combined with one another they give better shale stabilization performance than either one alone, as measured by Dynamic Pellet Test data. PHPVA, set forth below designates Du Pont Elvanol ® 5042, an 86.5 to 88.0% hydrolyzed polyvinyl acetate having a $M_n$ of 85,000, in the Tables.

TABLE 1

| Example (Control) | Test Solution in Base Mud* (Weight %) | DI | SI | HI | pH Start | pH End |
|---|---|---|---|---|---|---|
| 1 | 0.33% PHPVA + 0.66% K$_2$CO$_3$ | 0 | 12 | 37 | 10.4 | 10.1 |
| 2 | 0.33% PHPVA + 0.66% K$_2$SiO$_3$ | 0 | 15 | 21 | 10.3 | 10.2 |
| 3 | 0.33% PHPVA + 0.33% K$_2$CO$_3$ & 0.33% K$_2$SiO$_3$ | 0 | 11 | 48 | 10.5 | 10.1 |
| (A) | 0.5% PHPVA | 0 | 21 | 0 | 5.3 | 7.8 |
| (B) | 0.33% pHPVA + 0.66% Na$_2$CO$_3$ | 0 | 30 | 0 | 10.3 | 10.2 |
| (C) | 0.33% pHPVA + 0.66% Na$_2$SiO$_3$ | 0 | 22 | 0 | 11.2 | 10.5 |

*Base Mud = 0.35% Drispac + 0.20% XC Polymer

EXAMPLES 4–12

Table 2 shows that in order to stabilize shale effectively, the pH should be above 9 or greater.

TABLE 2

| Example | Test Solution (Weight %) | pH** | DI | SI | HI |
|---|---|---|---|---|---|
| 4 | 0.2% PHPVA + 0.8% K$_2$SiO$_3$ | 7.0 | 70 | 30 | 0 |
| 5 | 0.2% PHPVA + 0.8% K$_2$SiO$_3$ | 8.0 | 40 | 20 | 0 |
| 6 | 0.2% PHPVA + 0.8% K$_2$SiO$_3$ | 9.0 | 6 | 20 | 3 |
| 7 | 0.2% PHPVA + 0.8% K$_2$SiO$_3$ | 10.0 | 0 | 14 | 25 |
| 8 | 0.2% PHPVA + 0.8% K$_2$SiO$_3$ | 10.5 | 0 | 14 | 30 |
| 9 | 0.2% PHPVA + 0.8% K$_2$SiO$_3$ | 11.0 | 0 | 10 | 60 |
| 10 | 0.2% PHPVA + 0.8% K$_2$SiO$_3$ | 11.5 | 2 | 14 | 43 |
| 11 | 0.2% PHPVA + 0.8% K$_2$SiO$_3$ | 12.0 | 0 | 14 | 35 |
| 12 | 0.2% PHPVA + 0.8% K$_2$SiO$_3$ | 13.0 | 3 | 18 | 37 |

**pH adjusted as needed by use of HCl or KOH

EXAMPLES 13–16

Table 3 further demonstrates the efficacy of this invention. New-Drill HP represents state-of-the-art technology being currently favored for incorporation into aqueous muds for wellbore stabilization when drilling shale formations. It consists of 20 weight % partially hydrolyzed (about 30%) polyacrylamide, a hydrogen-bonding polymer of high molecular weight, and about 80% potassium chloride. When tested at 0.5% concentration as the only component of an aqueous drilling fluid, it showed a Disintegration Index (DI) of 49 (indicating that almost half of the pellet had sluffed off), a Swelling Index (SI) of 30, and a Hardness Index (HI) of 0 (indicating that it was quite soft). Addition of potassium carbonate improved its performance in all respects. There was no sluffing (the DI being 0), less swelling (the SI being 18), and increased hardness (the HI being 4). Similar results were obtained when potassium silicate was added to the New-Drill HP. A noticeable improvement took place when the two potassium salts were added in equal quantities. Still better results were attained by also introducing to the system, already containing the silicate and carbonate, two commonly used additives for aqueous drilling fluids, Drispac, an anionic cellulose derivative, and XC Polymer, a modified xanthan gum. The former is a fluid loss control agent, the latter a rheology control aid.

TABLE 3
DYNAMIC PELLET TEST

| Example (Control) | Test Solution (Conc. in Water) | pH Start | pH End | DI | SI | HI |
|---|---|---|---|---|---|---|
| 13 | 0.5% New-Drill HP + 0.5% K$_2$CO$_3$ | 11.1 | 10.5 | 0 | 18 | 4 |
| 14 | 0.5% New-Drill HP + 0.5% K$_2$CO$_3$ | 10.6 | 10.2 | 0 | 15 | 15 |
| 15 | 0.33% New-Drill HP + 0.33% K$_2$CO$_3$ + 0.33% K$_2$SiO$_3$ | 10.6 | 10.3 | 0 | 12 | 30 |
| 16 | 0.33% New-Drill HP + 0.33% K$_2$CO$_3$ + 0.33% K$_2$SiO$_3$ + 0.35% DRISPAC + 0.2% XC Polymer | 10.4 | 10.2 | 0 | 10 | 54 |
| (D) | Oil Base Mud | 7.0 | 5.6 | 0 | 0 | 93 |
| (E) | 0.5% New-Drill HP | 9.3 | 8.3 | 49 | 30 | 0 |
| (F) | 0.5% New-Drill HP + 0.35% DRISPAC + 0.2% XC Polymer | — | 8.5 | 17 | 30 | 0 |

EXAMPLES 17–24

Vinyl acetate copolymers, having the composition set forth in Table 4, were tested in the manner described for Table 1, giving the results set forth in Table 5.

TABLE 4

| | Comonomer | | Copolymer | | |
|---|---|---|---|---|---|
| Example | % | Type | Mn | Mw/Mv | Mz |
| 17 | 1.7 15. | Acrylic Acid & Dimethyl Maleate | NA | NA | NA |
| 18 | 8.2 | Acrylamide | 56,700 | 129,000 | 220,000 |
| 19 | 15. | Methylacrylate | 67,800 | 167,000 | 335,000 |
| 20 | 39. | Acrylic Acid | 17,300 | 38,400 | 65,700 |
| 21 | 14. | Acrylic Acid | 52,200 | 105,000 | 168,000 |
| 22 | 15. | Acrylic Acid | 41,000 | 83,400 | 134,000 |
| 23 | 23. | Acrylic Acid | 23,400 | 68,700 | 198,000 |
| 24 | 18.7 | Acrylamide | 56,800 | 188,000 | 426,000 |

TABLE 5

| | DPT Indices | | | |
|---|---|---|---|---|
| | Pierre Shale | | | Mud |
| Example | DI | SI | HI | Type |
| 17 | 0 | 11.9 | 25.0 | a |
| | 0 | 11.2 | 35.0 | a |
| 18 | 0 | 12.8 | 3.1 | b |
| | 0 | 16.7 | 16.0 | b |
| | 0 | 14.9 | 21.0 | a |

TABLE 5-continued

| | DPT Indices | | | |
|---|---|---|---|---|
| | Pierre Shale | | | Mud |
| Example | DI | SI | HI | Type |
| | 0 | 12.5 | 21.0 | a |
| 19 | 0 | 12.7 | 35.0 | b |
| | 0 | 18.5 | 10.0 | b |
| | 0 | 12.9 | 34.0 | a |
| | 0 | 9.5 | 44.0 | a |
| 20 | 0 | 12.0 | 40.0 | b |
| | 0 | 10.5 | 49.0 | b |
| | 0 | 12.5 | 39.0 | a |
| | 0 | 12.9 | 22.0 | a |
| 21 | 0 | 16.3 | 22.0 | b |
| | 0 | 15.8 | 20.0 | b |
| | 0 | 12.4 | 27.0 | a |
| | 0 | 11.7 | 41.0 | a |
| 22 | 0 | 13.1 | 52.0 | b |
| | 0 | 13.7 | 47.0 | b |
| | 0 | 12.8 | 31.0 | a |
| | 0 | 13.0 | 32.0 | a |
| 23 | 0 | 9.5 | 55.0 | b |
| | 0 | 11.2 | 51.0 | b |
| | 0 | 15.0 | 22.0 | a |
| | 0 | 12.8 | 30.0 | a |
| 24 | 0.1 | 16.8 | 22.0 | b |
| | 1.0 | 17.0 | 17.0 | b |
| | 0 | 13.2 | 33.0 | a |
| | 0 | 11.6 | 34.0 | a |

(a) Mud used; 0.4% polymer + 0.6% Kasolv 2.0 (1.0% DUPONOL WBS-100) + 0.8% CO$_3$ base mud (0.35% PAC + 0.20% XC + 0.25% K$_2$CO$_3$).
(b) Mud used; 0.24% polymer + 0.44% Kasolv 2.0 + 0.32% K$_2$CO$_3$ + 0.35% PAC + 0.20 XC.

We claim:

1. An additive composition for aqueous drilling fluids which imparts improved wellbore stability when used in drilling shale formations consisting essentially of of one or more water-soluble partially hydrolyzed high molecular weight polyfunctional polymers of vinyl acetate or acrylamide capable of forming several nucleophilic sites when treated with base, and an effective quantity of one or more potassium salts whose anions are Bronsted-Lowry bases of sufficient strength to raise the pH of the resultant drilling fluid to above 9.0 but which are relatively weak nucliophiles when compared to the polymeric nucleophilic sites, wherein said polymer and said potassium salt are present in polymer:potassium salt weight ratio between about 1:20 and about 3:1.

2. The composition of claim 1 wherein said polymer is partially hydrolyzed polyvinyl acetate.

3. The composition of claim 2 wherein said polymer:salt weight ratio is in the range between about 1:2 and about 1.5:1.

4. The composition of claim 2 wherein said one or more potassium salts comprises potassium silicate.

5. The composition of claim 2 wherein said one or more potassium salts comprises a mixture of potassium silicate and potassium carbonate.

6. An aqueous well-drilling fluid containing between about 0.01 and about 10 weight percent, based on the weight of the aqueous phase, of the additive composition of claim 1.

7. An aqueous well-drilling fluid containing between about 0.01 and about 10 weight percent, based on the weight of the aqueous phase, of the additive composition of claim 3.

8. An aqueous well-drilling fluid containing between about 0.01 and about 10 weight percent, based on the weight of the aqueous phase, of the additive composition of claim 2.

9. The aqueous well-drilling fluid of claim 8 in which said additive composition content is between about 0.1 and about 4.0 weight percent, based on the weight of the aqueous phase.

10. The aqueous well-drilling fluid of claim 8 in which said additive composition content is between about 0.3 and about 2.0 weight percent, based on the weight of the aqueous phase.

11. An aqueous well-drilling fluid containing an effective amount of the additive composition of claim 4.

12. An aqueous well-drilling fluid containing an effective amount of the additive composition of claim 5.

13. The aqueous well-drilling fluid of claim 12 in which said additive composition content is between about 0.01 and above 10 weight percent.

14. The aqueous well-drilling fluid of claim 12 in which said additive composition content is between about 0.1 and about 4.0 weight percent.

15. The aqueous well-drilling fluid of claim 12 in which said additive composition content is between about 0.3 and about 2.0 weight percent.

16. A method for drilling effectively through unconsolidated shales which comprises using the aqueous drilling fluid of claim 6 in the drilling operation.

17. A method for drilling effectively through unconsolidated shales which comprises using the aqueous drilling fluid of claim 7 in the drilling operation.

18. A method for drilling effectively through unconsolidated shales which comprises using the aqueous drilling fluid of claim 8 in the drilling operation.

19. A method for drilling effectively through unconsolidated shales which comprises using the aqueous drilling fluid of claim 9 in the drilling operation.

20. A method for drilling effectively through unconsolidated shales which comprises using the aqueous drilling fluid of claim 10 in the drilling operation.

21. A method for drilling effectively through unconsolidated shales which comprises using the aqueous drilling fluid of claim 16 in the drilling operation.

22. A method for drilling effectively through unconsolidated shales which comprises using the aqueous drilling fluid of claim 12 in the drilling operation.

23. A method for drilling effectively through unconsolidated shales which comprises using the aqueous drilling fluid of claim 13 in the drilling operation.

24. A method for drilling effectively through unconsolidated shales which comprises using the aqueous drilling fluid of claim 14 in the drilling operation.

25. A method for drilling effectively through unconsolidated shales which comprises using the aqueous drilling fluid of claim 15 in the drilling operation.

* * * * *